United States Patent [19]

Stamer

[11] Patent Number: 4,880,648

[45] Date of Patent: Nov. 14, 1989

[54] PROCESS FOR MANUFACTURING STORABLE FRUIT PREPARATIONS CONTAINING WHOLE FRUITS

[76] Inventor: Hans Stamer, Kurt-Schumacher-Strasse 53, D-2120 Lüneburg, Fed. Rep. of Germany

[21] Appl. No.: 220,220

[22] PCT Filed: Sep. 29, 1987

[86] PCT No.: PCT/EP87/00555

§ 371 Date: Jul. 28, 1988

§ 102(e) Date: Jul. 28, 1988

[87] PCT Pub. No.: WO88/02218

PCT Pub. Date: Apr. 7, 1988

[30] Foreign Application Priority Data

Oct. 4, 1986 [DE] Fed. Rep. of Germany ....... 3633820
Jul. 22, 1987 [DE] Fed. Rep. of Germany ....... 3724214

[51] Int. Cl.⁴ .................................................. A23L 3/16
[52] U.S. Cl. .................................... 426/241; 426/521; 426/639
[58] Field of Search ............... 426/241, 639, 419, 615, 426/577, 521

[56] References Cited

U.S. PATENT DOCUMENTS

| 3,658,554 | 4/1972 | Hirota | 426/639 |
| 4,298,623 | 11/1981 | Anderson et al. | 426/639 |
| 4,542,033 | 9/1985 | Agarwala | 426/639 |
| 4,562,085 | 12/1985 | Ruggiero | 426/639 |

FOREIGN PATENT DOCUMENTS 3205982 2/1982 Fed. Rep. of Germany.
58-60961 4/1983 Japan.
2098040 3/1982 United Kingdom.

OTHER PUBLICATIONS

Heaton, "Effect of Pretreatment on Quality of Sweet Peach Pickles", Journal of Food Science, vol. 46 (1981), pp. 906–911.

*Primary Examiner*—George Yeung
*Attorney, Agent, or Firm*—Merchant, Gould Smith, Edell Welter & Schmidt

[57] ABSTRACT

Freely-rolling fruits are mixed with crystalline sugar or a highly concentrated sugar solution, and this fruit and sugar mixture is then sterilized by heat treatment. After the juice has been carefully formed, the fruit is separated from the juice, the consistency of the latter being at least approximately adjusted, and then the fruit and juice are again combined. The mixture is then heated for a short period, in a heating region, by means of a microwave field excited in an $E_{01}$ mode. The process is particularly suited for fruit preparations containing soft fruit, the properties of which remain largely unchanged. The fruit preparations thus obtained can be used individually or mixed with foodstuffs, for example yogurt, cottage cheese or desserts.

24 Claims, No Drawings

PROCESS FOR MANUFACTURING STORABLE FRUIT PREPARATIONS CONTAINING WHOLE FRUITS

The invention relates to a process for manufacturing fruit preparations containing whole fruits and storable without preservatives, in which freely rolling fruits are mixed with crystalline sugar or highly concentrated sugar solution and the mixture of fruits and juice is thereafter heat sterilised.

Storable fruit preparations are required by the foods industry for different purposes. They can be offered to the consumer as pure fruit products, for example, as compote, or as additives to, for example, sweet foods, acidified milk products and more especially yoghourt.

One of the most attractive offers is yoghourt which is mixed with largely intact, lumpy fruits.

Since fruits form an ideal substrate for more especially yeasts and fungi of various types and promote the formation of resistant spores, such fruit preparations have to be sufficiently sterilised. The sterilisation was formerly effected either by the addition of preservatives and/or by heat treatment.

It is true that the preservatives, such as ascorbic acid or sorbic acid, which are used for preserving fruits or fruit mixtures are per se nutritionally and physiologically unobjectionable, but they do, however, act as antioxidants and thus destroy important substances, for example, vitamins, which are contained in the fruits. On mixing with yoghourt, the preservatives contained in the fruit preparations in part also suppress the products of metabolism of the microorganisms which are desired in the yoghourt and block their enzyme systems. The result is accordingly that they do have a preserving effect on the fruit preparation, but after mixing into the yoghourt mass, lower the physiological value thereof.

In general, therefore, fruit preparations which are provided for the preparation of fruit yoghourt have added thereto as little as possible of preservatives or made heat-stable without preservatives. In this connection, the heat preservation is effected by transfer of heat from an energy carrier with high energy content to the fruit preparation to be preserved with correspondingly lower energy level. In this connection, the preparation is heated to at least 85° to 125° C.; this temperature has to be reached by each particle which is contained in the preparation. If there are lumpy fruits in the preparation, then the duration of the temperature treatment necessary for preserving purposes is overproportionally increased and what happens is not only a destruction of the macrostructures and microstructures of the fruits, but also aroma losses, colour changes and transpositioning of acid and sugar, which leads to the destruction of important substances contained therein. More especially fruits with relatively soft fruit flesh, hereafter designated as "soft fruits", are almost completely destroyed under such circumstances and are transformed into a fruit pulp.

If the mechanical loading and also the height and time of effect of the temperature are lowered, it is true that the fruits can be largely kept intact, but this produces a high bacteriological risk, since more especially spores cannot be thoroughly killed off.

In order to counteract this risk, the yoghourt mass, after being mixed with the fruit preparation, is frequently once again subjected to a heat treatment. With this, however, not only the undesired microorganisms, but also the valuable yoghourt bacteria are killed off; furthermore, enzymes and vitamins are inactivated and proteins are destroyed.

It has been proposed to avoid these disadvantages by treating the prepared and packed yoghourt in a multi-frequency process (cf. separate leaflet from "Die Molkereizeitung, Welt der Milch", No. 39 (1977)). With this process, the carton trays are placed in a rotating water bath, which reaches to just below the filling height of the cartons. They are treated horizontally with radiation in the high-frequency range and vertically with radiations in the ultra-high frequency range. The necessary temperature level and treatment period is lowered considerably as compared with the conventional temperature treatment. Also with this process, however, the desired yoghourt cultures are also killed off and, in addition, the process is extraordinarily expensive and time-consuming. The maximum achievable output is about 200 kg/hour.

A similar process has also been described for preserving fruit preparations (cf. British Pat. No. 1 583 884). In this process, the fruits are placed in containers and treated in a water bath, from the side and from above, with high-frequency or ultrahigh-frequency radiation. Because of the limited depth of penetration of the radiation, however, only comparatively small containers can be used, and in addition, these containers cannot be effectively preheated, since the transfer of heat from the outer into the inner region only takes place slowly and would lead to a considerable fall in temperature. In addition, the difficulties which, with this process, counteract a rapid and uniform cooling, lead to problems as regards quality. Consequently, the process is unsuitable, both technically and economically, for the production of preservable fruit preparations on an industrial scale.

A process of the type as initially referred to is known from German OS No. 32 05 982, in which whole, or cut-up and preferably deep-frozen fruits have sugar solution added thereto and the forming mixture is thereafter pumped continuously through a steriliser. The steriliser is formed by a tubular heater, which is acted upon externally by hot water.

It is true that this known process guarantees an already relatively protective handling of the fruits. However, it is necessary thoroughly to stir the total mixture prior to the sterilisation, in order that, for example, acid regulators and additives for consistency adjustment, may be homogeneously distributed therein. Nevertheless, the forming mixture is not homogeneous, and the fruits swim in the juice. Since the thorough heating of the mixture is effected only by way of the tube wall, the total residence time in the steriliser is long and, in addition, the heating is non-uniform, so that portions of the mixture are excessively heated.

In total, there is also produced with this known process a considerable loss of structure of the fruits, accompanied by quality losses at molecular level.

The invention has for its object to provide an economic method of the type initially referred to, which can be used in the foodstuff industry, which is also suitable for soft fruits and with which the microstructures and macrostructures of the fruits and also the substances contained therein, such as for example vitamins and aromatics, are largely maintained.

This object is achieved according to the invention by the features of the claim 1.

Preferred constructional forms of the invention are to be seen from the subsidiary claims 2 to 15; advantageous uses are defined by the claims 16 and 17.

The process according to the invention is more especially suitable for the treatment of those fruits which are used, undivided, in acidified milk products or desserts. Examples of these are berry fruits, such as strawberries, raspberries, blackcurrants, bilberries, etc., and also cherries and plums.

The fruits can be introduced, fresh or deep-frozen—into the process; with soft fruits, good results are produced, especially in the deep-frozen state.

When carrying out the process, first of all freely rolling fruits are combined with crystalline sugar or a highly concentrated sugar solution. As highly concentrated sugar solution, there may be used a synthetically produced solution or a highly concentrated syrup originating from natural sources.

The mixture of, for example, deep-frozen soft fruits and sugar or sugar solution, is heated in a suitable container, for example, a tank, and at the same time carefully kept moving. In order to make this careful movement possible, the container may, for example, be mounted on a shaft, so that the container is able to execute a tumbling movement. The fruits are kept in the emerging juice or the mixture of sugar solution and juice until their dry measure is about 35–65% by weight, advantageously 55% by weight. For determining the dry measure, fruit samples are freed from adhering liquid and thereafter the dry measure is determined in known manner.

In one particularly preferred embodiment, the mixture has added thereto 0.2–0.4% by weight, advantageously 0.3–0.35% by weight, of sodium citrate, relates to mixture of fruits and sugar or sugar solution. This causes an increase in solidity or compactness of the fruits.

Thereafter, the whole fruits, which suffer practically no loss of structure as a result of this careful juice extraction, are gently separated from the juice, for example, by means of a sieve. Advantageously serving for this purpose is a sieve insert or fitting inside the container, which only has to be lifted for the separating of the fruits.

The recovered juice is adjusted, wholly or in part and more especially by heating with a thickening agent to a maximum of 100° C. to a density which corresponds approximately to the density of the separated fruits. This density adjustment can proceed with a concentration of the juice by evaporation. At this time, it is advantageous simultaneously to adjust a higher viscosity of 50–70 mPa s. Suitable as thickening agents are, for example, pectin, powdered curds, guarana seed flour carob bean flour, carragen or mixtures of different such thickening agents. A quantity of juice corresponding to the weight of the fruits is advantageously adjusted with an acid regulator to a pH value of about 3 to 4, colouring agents and aromatics possibly being added. Suitable as acid regulators are table acids, such as, for example, citric acid. To be considered as colouring and aromatising substances are, for example, red beet juice, grape skin concentrate and natural or similar aromatic substances, which are advantageously used up to an amount of about 0.65% by weight, related to the total mixture of fruits and juice.

The juice, pretreated in this manner and adjusted as regards quantity, density and viscosity is now carefully united at a temperature of 30°–40° C., advantageously 35° C., with the whole fruits. The fruits are uniformly distributed in the juice by extremely careful stirring. Because of the approximately like densities of fruits and juice, the fruits do not float, but in fact remain approximately uniformly within the total volume of the juice. The higher viscosity of the juice contributes to the maintaining of this homogeneous distribution of the fruits in the juice, in that the swimming movements of the fruits are obstructed. As a whole, therefore, a mixture is obtained in which the fruits—at least considered over relatively short time periods—are suspended practically immovably in the juice.

If, as stated above, only a part of the fruit juice originally obtained from the fruits is further treated in the process according to the invention, the juice which remains can be carefully concentrated or dried, for example, freeze-dried, and can serve as an aromatic substance. For example, such freeze-dried juice can be used in the production of yoghourt.

The stabilised and homogeneous fruit preparation as thus obtained is now carefully conducted, for example, by its own gravity, to a large-volume, continuously operating pump, advantageously of the type of the two-blade rotary piston or disc piston pumps, or sine pumps, and is carefully pumped thereby through a heating path. By the pre-treatment according to the invention, also soft fruits are stabilised to such an extent that they are able to be pumped without essential damage to their macro- and micro-structures. Examples of suitable pumps are the two-blade Johnson rotary piston pump PD 22-50 GRD, the two-blade SSP circular piston pump and also the Maso sine pump SPS-3.

The homogeneity and uniform density of the mixture, as adjusted according to the invention, together with fruits substantially freely suspended in the juice, is more especially proved to be advantageous with the following heating. This heating, which serves for the stabilisation, is advantageously effected exclusively by microwaves, since in this way any local overheating is avoided.

In another constructional form of the invention, the mixture is conducted by the pump continuously and pulsation-free through a tubular heating bath or section, which comprises a fluid-heated preheating zone arranged before the microwave heating zone and, by the passage through the preheating zone prior to entering the microwave heating zone, reaches a temperature of about 50°–60° C., advantageously about 55° C. On account of this preheating, only a comparatively slight temperature difference has to be overcome before reaching the temperature of about 60–90 C., advantageously 80°–90° C., which is necessary in the heating zone for the preservation. This causes an improvement in the quality of the fruit preparation, since the residence time in the micro-wave heating zone can be kept correspondingly short and the mixture is exposed to the high temperature for only a very short period of time, namely, 3–6 and advantageously 4–5 seconds. On the other hand, a renewed mixing operation before entering the micro-wave heating zone is usually proven to be necessary, so that this embodiment is advantageously used for more stable fruits. In addition, the pre-heating, which is only effected by heat transfer from the tube or pipe wall, can place an excessive burden on particularly sensitive fruits. In this case, a heating exclusively by micro-waves is to be preferred, even if the residence time in the high-temperature zone is longer.

In both embodiments, the actual preservation takes place in the micro-wave heating zone. In this zone, the fruit preparation can be conducted through a Teflon tube; according to the invention, however, a glass tube is advantageously used. In this way, the fruits may also be heated with excess pressure and with briefly very high temperature, for example, at 125° C., and as a result are completely sterilised. Preferably, the fruits are heated above about 121 C. to effect the complete sterilization.

The frequency of the electromagnetic micro-wave fileds is advantageously between 600 and 2000 Mc/s. The use of a tubular micro-wave heating zone with a round hollow conductor, in which the electromagnetic micro-wave field is energised in an $E_{01}$-mode according to the invention, causes a rapid and homogeneous heating of the mixture over the irradiation cross-section. In this connection, the approximate equal density of juice and fruits has a particularly advantageous effect; in comparison with mixtures, the components of which have more unequal densities, the heating is very much more uniform and thus also quicker. It is understood that the macro-structure and also the micro-structure is very much more protected to below the molecular plane of the mixture, if temperature gradients and heating time can be minimised in the sense according to the invention.

At the transition from the micro-wave heating zone into the cooling zone (which follows with both embodiments), it is possible to interpose an extremely fine measuring pump, by which colours and aromas may be introduced into the mixture. The resulting hereby achieved is that the temperature-sensitive colouring and aromatising substances are not destroyed in the micro-wave heating zone and yet are also made lasting on account of the high exit temperature of the preparation.

With fruits which are highly contaminated with microorganisms, it is recommended to carry out a fractionated heat treatment. For this purpose, the prepared fruit, after passing through the heating section, is first of all cooled to about room temperature and, after a certain time period, which is sufficient for the cessation of the germination of spores which possibly have remained alive, is once again subjected to the heat treatment which has been described above.

The mixture is cooled to about 15°-25° C. in the cooling zone which follows the micro-wave heating zone. With the constructional form as previously described, the output of the heating path as a whole is about 800 kg/hour.

For loadable fruits, the efficiency of the procedure can be improved by the fact that the preheating zone and the cooling zone of the tubular heating section as then to be provided are surrounded by a self-contained pipe exchange system, the heat exchange medium of which supplies to the preheating zone the heat which is taken up in the cooling zone. In this closed system, there is practically no loss of energy and the demand for energy in the heating zone proper is considerably lower than would be the case without preheating.

After leaving the cooling zone, the mixture is collected under sterile conditions and if necessary introduced into containers. With suitable adjustment of density and viscosity, the mixture remains homogeneous, even over relatively long time periods, i.e. the state of suspension of the fruits in the juice is still maintained and any kind of buoyancy or floating movement of the individual fruits (for example, because of not fully balanced density differences) are largely suppressed by the viscosity of the mixture.

As a result, it is in any case unnecessary, with relatively short intermediate storage, for the mixture to be again stirred prior to a further processing stage. This also contributes to maintaining the fruits in an intact form.

The fruit product which is produced according to the invention is one which, nutritionally and physiologically, is of high quality and, economically, is attractive, having substantially undamaged whole fruits, said product containing the fruit contents, such as vitamins, aromatics, minerals, sugar, etc., largely in a natural state.

The preparation can be used as such or in admixture with other food products, such as, for example, acidified milk products or for the preparation of desserts.

The fruit preparation according to the invention is more especially suitable for the production of yoghourt which contains whole fruits and can be stored under cooled conditions. For this purpose, the fruit preparation, either directly after leaving the previously described heating section or a sterile container, is dispensed under aseptic conditions in known manner along mixing paths into the yoghourt stream. The ratio of fruit preparation to yoghourt in this connection is generally about 20:80% by wt. The further processing and portioning of the yoghourt containing whole fruits is carried out by known methods under essentially aseptic conditions. Since the fruit preparation is not a risk factor as regards the keeping qualities, it is superfluous, when using the fruit preparation according to the invention, to carry out a further sterilisation of the obtained yoghourt. Thus the valuable and desired yoghourt bacteria remain therein in a livable state. The product obtained has a storage capacity of at least 28 days at 10° C.

Moreover, excellent results are obtained when using the fruit preparation according to the invention for the manufacture of fruit quark or curd and sweet fruit desserts.

The invention is hereafter explained by reference to examples:

EXAMPLE 1

500 kg of deep-frozen, freely rolling and unthawed strawberries were introduced into a double-walled container heatable by steam and having a sieve insert. After introducing 500 kg of saccharose in crystal form, the container was heated and the contents thereof warmed to about 30°-35° C. After the thawing of the fruit, the water from the fruit emerged and, after about 10 to 12 hours, the fruits were swimming in a solution formed of fruit water and sugar. 3 kg. of sodium citrate were added to the mixture and tumbling motion was imposed on the container vessel in order to avoid a "ring of water" around the stawberries. After 24 hours, the dry mass of the strawberries was increased from initially 12% by weight to 55% by weight. By hydraulic raising of the sieve insert, the fruits were now separated from the juice. After draining the fruits, there were obtained 300 kg of fruits and 700 kg of juice. The fruits were introduced by means of a hydraulic tilting apparatus into a mixing vessel.

300 kg of the juice were mixed with 3.6 kg of stabiliser mixture, consisting of carob bean flour (E410), guara flour (E412), pectin (E440a) and carragen (E407), in approximately equal parts by weight and, after adjusting the pH value of the juice to 3.7 with citric acid, (E330), heated for 20 minutes to about 98° C. Immediately before conclusion of this heating phase, 0.32 kg of grape skin concentrate (E136) were introduced into the juice. The juice was cooled to 80°–85° C., also pumped into the mixing container and mixed with the fruits, while stirring carefully. The temperature of the mixture amounted to about 35° C. Thereafter, the fruits were suspended, uniformly distributed and without a "water ring" in the thickened juice. The viscosity of the juice, measured with a Haake instrument with rotatable body MV I at 20° C. was 61.4 mPa s.

The fruit mixture was thereafter transferred by its own gravity into a sterile container disposed beneath mixing container and conveyed from thence, with a large-volume, two-vane Johnson rotary piston pump PD 22-50 GRD and without pulsation through the closed piping system to a heating section. The heating section consisted of a tubular preheater, a continuously operating tubular micro-wave heater and a tube cooler, using a glass tube with a nominal width of 40 mm.

In the preheating region, the fruit preparation was heated to about 55° C. Thereafter, the mixture passed through the microwave heating zone. The passing took 4–5 seconds, during which the mixture was heated to 85° C. The radiation frequency in the micro-wave heating zone amounted to 915 Mc/s. In the cooling zone immediately adjoining the heating zone, the fruit preparation was cooled to 20° C. and collected in a sterile container accommodating 800 kg.

The output of the system was in the region of 800 kg/hour.

EXAMPLE 2

Production of Fruit Yoghourt 1000 l. of milk were raised by vacuum evaporation in the fat-free dry mass by 3% and thereafter homogenised, at 55° C. and a pressure of 150 bars in a single-stage Rannie homogenising machine, heated to 90° C. and maintained for 10 minutes at this temperature.

The milk was then cooled to 39° C., transferred into a sterile tank and seeded with a yoghourt culture, which contained the strains *Streptococcus thermophilis*, *Lactobacillus bulgaricus* and *Streptococcus filant*, and was lyophilised. The seeded milk was incubated for 10–12 hours at 38° C. A yoghourt-milk jelly was obtained, of which the pH value was 4.8 and which showed a uniform smooth consistency.

The jelly was thereafter homogenously stirred at initially low and then increasing speeds of rotation, cooled in a plate-type cooler and intermediately stored at 20° C. in a buffer tank.

From the latter, the yoghourt mass was pumped to the filling plant. Through a pipe section opening into the filling plant immediately before the measured devices, the fruit mixture according to Example 1 was fed into the yoghourt mass and homogeneously mixed with this latter with the aid of a built-in dynamic tubular mixer. The ratio by volume between yoghourt mass and fruit preparation was in this case about 4:1. The mixture was thereafter used under aseptic conditions for filling 250 g cartons, which left the filling plant in the sealed state. 400 specimens of the total production were each stored for 28 days, half of them at 10° C. and the other half at 18° C. At the end of this period, all the samples were free from yeasts and moulds. The pH value of the samples stored at 10° C. was 4.05 and that of those stored at 18° C. was 3.55.

EXAMPLE 3

Production of Fruit Quark 1000 liters of skimmed milk were heated to 92° C. and kept for 10 minutes at this temperature. The milk was thereafter cooled to 26° C. and seeded in a fermentation tank with a mixed culture which contained the strains *Streptococcus lactis*, *Streptococcus cremoris* and *Streptococcus diacetilactis*. The milk was thereafter incubated at 26° C. until a pH value of 6.2 was reached.

Thereafter, 1.5 g. of liquid rennet (concentration 1:10,000) per 1000 liters were added to the milk. After dropping below the isoelectric point, the quark milk-jelly was stirred with increasing speeds of rotation and thereafter passed through a separator, in which the food quark was separated from the whey.

The obtained quark (about 220 kg) was cooled to about 12° C. and stored for a period in a sterile tank. As in Example 2, the quark mass was mixed and portioned with the fruit preparation according to Example 1, an additional 40% cream being fed into the filling plant in order to bring the quark to a fat content of 20% i.Tr.

The same number of samples as in Example 2 were stored under like conditions. At the end of the storage period, all specimens were free from yeasts and moulds. The pH value of the samples stored at 10° C. was 4.35; the pH value of the samples stored at 18° C. was 3.85.

EXAMPLE 4

Production of Fruit Dessert with Whipped Cream 500 liters of cream with a fat content of 30% were mixed with 4% by wt. of glucose syrup, 4% by wt. of fine sugar and 0.2% by wt. of carragenan (E407), in each case related to the total quantity, heated to 55° C. and homogenised at this temperature and at a pressure of 150 bars in a single-stage Rannie homogenising machine. The mixture was thereafter heated to 134° C., kept at this temperature for 3 to 4 seconds and then cooled to 4° C.

After being intermediately stored for 6 hours in a sterile storage tank, the cream was whipped in a continuously operating whipping machine (Mondomix) with germ-free nitrogen dioxide under aseptic conditions. The whipped volume amounted to 150%.

The whipped cream was fed to an aseptically operating filling unit, which first of all measured out 75 g of the sterile fruit preparation according to Example 1 and thereafter 25 g of the cream as topping into 125 ml cartons and the cartons were sealed in sterile manner.

Once again 400 samples of the total production were extracted and half of them were stored at 10° C. and the other half at 18° C. for 21 days.

After this time had elapsed, all samples were free from yeasts and moulds. In all cases, the whipped cream still had a loose consistency and—apart from a slightly reddish colouring—was unchanged at the boundary layer between cream and fruit.

I claim:

1. Process for the production of storable fruit preparations containing whole fruits without the addition of preservatives, wherein whole fruit is mixed with crystalline sugar or a concentrated sugar solution to form a first mixture of fruit and juice, the process comprising the steps of:
    (a) gently agitating the first mixture until the dry mass of the fruit amounts to about 35 to 65% by weight,
    (b) gently separating the fruit from the juice, (c) adjusting the density of at least a portion of the juice to a density effective to substantially uniformly suspend the separated fruit in the juice, (d) combining the density adjusted juice and the separated fruit to form a second mixture in which the fruit is substantially uniformly suspended in the juice, (e) uniformly heating the second mixture by use of micro-wave energy in a micro-wave heating zone, and (f) cooling the second mixture to form a sterilized fruit preparation containing whole fruit.

2. Process according to claim 1 wherein the density of the juice is adjusted in step (c) by addition of a thickening agent.

3. Process according to claim 1 wherein the juice combined with the fruit is adjusted with an acid regulator to a pH value of 3 to 4.

4. Process according to claim 1 wherein the density of the juice is adjusted in step (c) by extracting water from the juice.

5. Process according to claim 1 wherein the fruit is a deep-frozen fruit.

6. Process according to claim 1 further comprising the step of adding sodium citrate to the first mixture in an amount of 0.2 to 0.4% by wt., related to the total mixture.

7. Process according to claim 1 wherein the dry weight of the fruit is allowed to rise to 55% by wt. in step (a).

8. Process according to claim 2 wherein the thickening agent is selected from the group consisting of pectin, guarana seed flour, carob bean flour, carragen and mixtures thereof.

9. Process according to claims 1 wherein the second mixture is continuously feed through the micro-wave heating zone by means of a pump selected from the group consisting of a rotary piston pump, a circular piston pump, and a sine pump.

10. Process according to claim 1 wherein the second mixture is heated by conducting the second mixture through the micro-wave heating zone in a round hollow conductor and the electromagnetic micro-wave field in the conductor is energised in an $E_{01}$-mode.

11. Process according to claim 1 wherein the second mixture is heated in step (e) to a temperature from 60° to 90° C.

12. Process according to claim 1 wherein the second mixture is heated to a temperature above 121° C. for a time period approximating the minimum time period necessary to ensure complete sterilization of the second mixture at that temperature.

13. Process according to claim 1 wherein the second mixture is preheated in a preheating zone prior to heating in the micro-wave heating zone by means of hot water which has been heated by the heat removed from the second mixture during cooling of the second mixture in step (f).

14. Process according to claim 13 wherein the second mixture is carefully blended between the preheating zone and the micro-wave heating zone.

15. Process according to claim 1 wherein the fruit preparation is subjected to a fractionated heat treatment in that the micro-wave heating of step (e) is repeated.

16. Process according to claim 1 further comprising the step of combining the sterilized fruit preparation with an acidified milk product.

17. Process according to claim 1 wherein the density of the juice is adjusted to substantially correspond to the density of the separated fruit.

18. Process according to claim 2 wherein heat is added to the juice simultaneously with addition of the thickening agent.

19. Process according to claim 3 wherein an additive selected from the group consisting of a color enhancer and an aroma enhancer is added to the juice.

20. Process according to claim 1 wherein the fruit is a soft fruit.

21. Process of claim 3 wherein the acid regulator is citric acid.

22. Process of claim 16 wherein the acidified milk product is selected from the group consisting of yoghourt and fruit quark.

23. Process according to claim 11 wherein the second mixture is maintained at a temperature of about 60 to 90 C. for about 3 to 6 seconds.

24. Process according to claim 1 wherein the process further comprises the step of adjusting the viscosity of the density adjusted juice to a viscosity of about 50–70 mPa s.

* * * * *